March 20, 1951 — L. W. T. CUMMINGS — 2,545,651
FRACTIONATING TOWER BUBBLE CAP TRAY
Filed Nov. 9, 1946 — 2 Sheets-Sheet 1
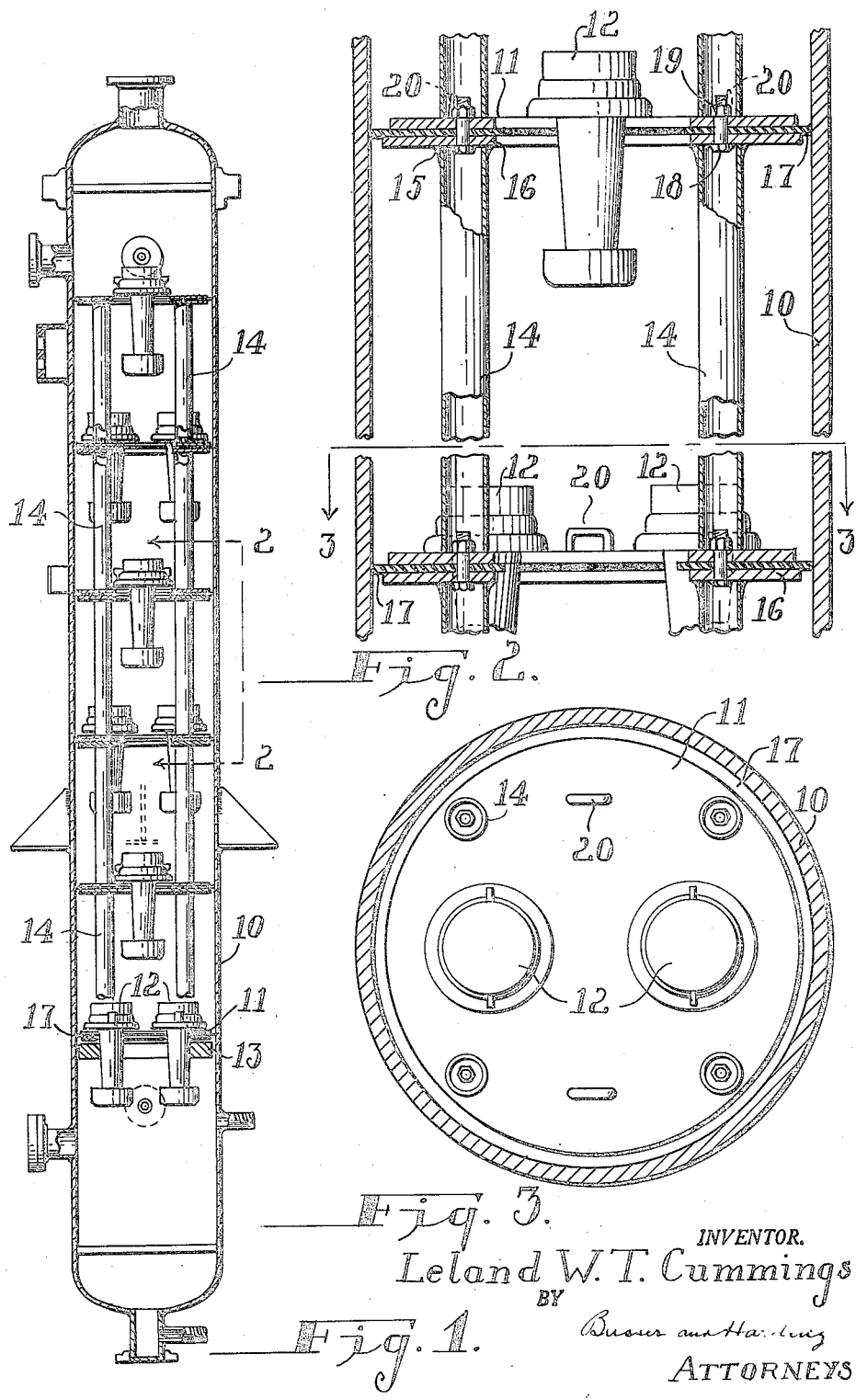
INVENTOR.
Leland W. T. Cummings
BY
ATTORNEYS Patented Mar. 20, 1951

2,545,651

UNITED STATES PATENT OFFICE 2,545,651

FRACTIONATING TOWER BUBBLE CAP TRAY

Leland W. T. Cummings, Wyncote, Pa., assignor to Sun Oil Company, Philadelphia, Pa., a corporation of New Jersey Application November 9, 1946, Serial No. 709,002

6 Claims. (Cl. 261—114)

This invention refers to distillation apparatus in general and more particularly to bubble cap trays used in liquid and vapor contact towers for oil refining.

Liquid and vapor contact towers for distillation, absorption, and fractionation of petroleum are usually assembled on the site. Field crews fabricate and attach bubble cap trays to the inside of the column shell. This requires skilled mechanics and careful construction to insure satisfactory operation.

After the trays are assembled in the tower, cleaning and maintenance become major operations. Trays must be unbolted by men who enter the tower at various levels through manholes. Usually a manhole is not located at every bubble cap tray level so that it is necessary to lift or tilt the unbolted trays to loosen higher or lower levels. Operations of this type require considerable time during which the plant is not operating and are a dangerous undertaking.

A principal object of my invention is to provide a liquid and vapor contact tower in which prefabricated bubble cap trays are used to facilitate construction and simplify maintenance during operation.

Another object is to provide a bubble cap tray which can be prefabricated and lowered into a column or tower without requiring further work in the field.

Yet another object of my invention is to provide a bubble tray which is not secured to the inside of the column but is freely supported by the subjacent trays, and can readily be removed and replaced for cleaning operations.

A further object of my invention is to provide a prefabricated bubble cap tray which will engage the interior wall of the column and prevent the descending fluids from by-passing the bubble caps insuring an efficient liquid-vapor contact.

Still a further object is to disclose a form of bubble cap tray which is simple of manufacture requiring no special tools or castings, yet is durable and efficient in operation.

And another object is to provide a support for bubble cap trays which can be prefabricated, readily inserted in or removed from a liquid and vapor contact tower, yet form a seal between the bubble cap tray and the tower.

These and other objects will be apparent from the description of the drawings and the claims annexed which form a part of this specification.

Of the drawings:

Figure 1 is an elevation in section of a liquid-vapor contact column showing the bubble cap trays.

Figure 2 is a vertical section on lines 2—2 of Figure 1.

Figure 3 is a transverse section on lines 3—3 of Figure 2.

Figure 4:
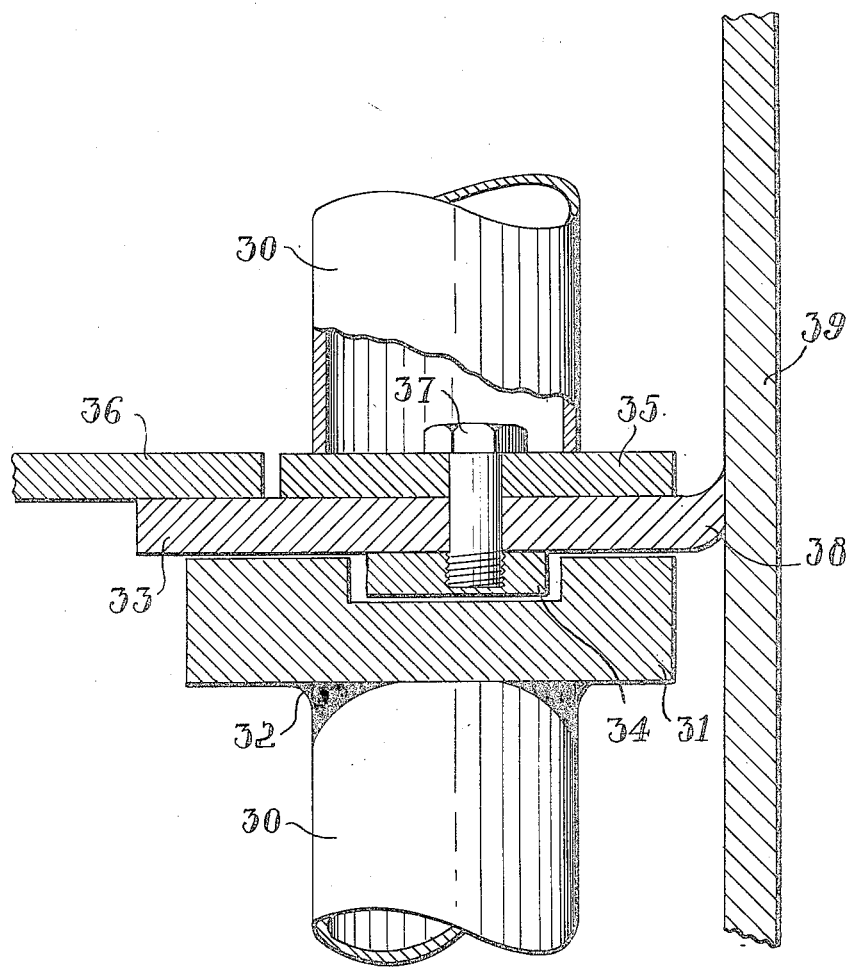
Figure 4 is a detail of another form of support.

The liquid and vapor contact tower, shown in Figure 1 is formed of a hollow cylindrical shell 10 enclosing a number of bubble cap trays generally designated by the numeral 11, each of which supports one or more bubble caps 12. The lowest bubble cap tray 11 is supported by ring 13 attached to the interior of the hollow cylindrical shell 10. Supported on this lowest tray by means of legs 14 the upper trays 11 are held in such vertical spaced relation as required to function with maximum efficiency. It will be noted that the lowest tray is identical in structure with those above but is shown in the drawing with the supporting legs removed. All trays can be fabricated with legs, the lower one resting on an annular flange or lugs fastened to the interior of the column. Horizontally, the bubble cap trays 11 are circumferentially in sealed relation with the inner wall of the contact tower shell 10 by means of flexible gasket 17. Down-coming liquids are caught by the gasket sealed bubble cap trays and retained until they flow over the bubble caps, thus being subjected to the rising vapors within the column during the prescribed interval of time.

Referring to Figures 2 and 3, in which like numbers denote like parts, two views of the bubble cap tray assembly are shown. Bubble cap tray 11 is shown supporting bubble caps 12. Pipe legs 14, in the preferred embodiment, are welded at 15 to ring 16. Flexible gasket 17 is positioned between tray 11 and ring 16 and secured by bolts 18 and nuts 19 to contact the inner wall of column 10 effecting a seal. Bolts 18 are welded on the under side of ring 16 to facilitate rapid and accurate assembly of the trays. Grab rings 20 are welded to the upper surface of trays 11 for ease in handling.

The apparatus described above illustrates one form of my invention. The leg supports are shown attached to ring 16 as part of the upper tray assembly but may be welded to the lower trays and project upward to support the tray above. Pipe has been used for the legs and centered over the bolts which hold the gasket in place and assist in centering the trays within the tower shell, but other forms of legs can be substituted.

Figures 1 to 3 inclusive illustrate the preferred embodiment of the invention for use in a side stream stripper which is especially adapted to the light construction shown. The general principle, however, is readily used in larger towers. Increased dimensions and weight make it desirable to assemble the prefabricated trays piecemeal as by first locating a support within the tower, adding a properly formed gasket, and finally placing the bubble cap tray on the gasket.

Figure 4 demonstrates one way in which the supports can be prefabricated and used in larger liquid and vapor contact towers. Many modifications of the principle are possible but need not be multiplied here as the drawings readily suggest many alternatives. For example, a simple, unitary bubble cap tray with openings for bubble caps has been illustrated throughout this specification. The apparatus disclosed here is, however, readily adaptable to segmented bubble cap trays. It is believed such changes are evident.

In Figure 4 a detail of the support holding a gasket on which the bubble cap tray is resting demonstrates an assembly for use in larger towers. A plurality of legs 30 are welded to the seal support ring 31 at any convenient points 32. The gasket seal 33 which may be in one piece or in several segments, as required, is supported between ring 34 on the under side and a larger centering ring 35 on the upper side which acts as a centering device for bubble cap tray 36. The rings 34 and 35, which lend rigidity to the gasket seal, are securely held on the top and bottom of the gasket seal 33 by fasteners such as bolts 37 or other means. The gasket 33 is shown distorted at 38 where it contacts the inner wall of shell 39 indicating a sealing contact.

I claim:

1. A bubble cap tray of prefabricated members for use in a liquid-vapor contact tower comprising a sealing member including an annular flexible gasket seal of slightly larger dimension than the inner periphery of the tower, an upper retaining ring of slightly less dimension than the periphery of said gasket, a lower retaining ring, fastening means to compress said rings in stiffening engagement with the flexible gasket seal thereby rigidly supporting said gasket seal between said rings and leave the annular gasket seal flexibly unsupported for complete peripheral contact with the interior wall of said tower, a tray member for the support of the bubble caps, adapted to peripherally engage the flexible gasket seal; and a stand to vertically and horizontally register said sealing and tray members in spaced relation to like members including a plurality of legs supportable from an adjacent superposed bubble cap tray in cooperation with an annular support adapted to engage the first specified bubble cap tray.

2. A bubble cap tray of prefabricated sections for use in a liquid-vapor contact tower comprising a sealing section including a flexible gasket seal conforming in shape to a horizontal section of said tower and of slightly larger dimension than the inner periphery of the tower, an upper retaining member of slightly less dimension than the periphery of said flexible gasket, a lower retaining member, and fastening means to compress said retaining members in stiffening engagement with the flexible gasket seal thereby rigidly supporting said gasket seal between said retaining members and leaving said gasket seal flexibly unsupported for complete peripheral contact with the interior wall of said tower; a stand section to vertically and horizontally register said sealing section in relation to other sealing sections in the tower comprising a seal support member adapted to receive and position the sealing section by engaging the lower retaining member thereof, and a plurality of legs rigidly attached to the under side of said seal support member; and a tray to position the bubble caps in predetermined arrangement, adapted to peripherally engage the flexible gasket seal between the tray and the supporting member of the stand section adjacent the upper retaining member of said sealing section.

3. A bubble cap tray of prefabricated sections for use in a liquid-vapor contact tower comprising a sealing section including a wide, flat gasket of flexible and elastic material conforming in shape to a horizontal section of said tower and of a slightly larger dimension than the inner periphery thereof; an upper retaining member of slightly less dimension than the periphery of said flexible gasket; a lower retaining member of a peripheral dimension less than that of the upper retaining member, and fastening means to compress said retaining members in stiffening engagement with the flexible gasket seal thereby rigidly supporting said gasket seal between said retaining members and permitting the gasket seal to extend flexibly unsupported beyond the periphery of said upper retaining member for peripheral contact with the interior wall of said tower; a stand section to vertically and horizontally register said sealing section in relation to other sealing sections in the tower comprising a seal support member adapted to receive and position the sealing section by engaging the lower retaining member thereof, extending peripherally to support the flexible gasket seal to the extent of the upper retaining member and of a width to support the flexible gasket to a substantial distance inside the internal periphery of said upper retaining member and a plurality of legs rigidly attached to the under side of said seal support member; and a tray adapted to peripherally engage the upper surface of said gasket adjacent the upper retaining member above the internally projecting surface of said support member thereby engaging the gasket therebetween.

4. In a liquid-vapor contact tower in which adjacent bubble cap trays are registered in relation to each other by vertical spacing legs, the improvement which comprises a tray the central section of which is adapted to support bubble caps, a separate flat gasket ring of flexible and elastic material engageable with the wall of the tower and beneath and constituting the support for the tray, a centering ring outside of and concentric with the bubble cap supporting section of the tray and overlying and secured to the gasket ring, and a seal supporting ring beneath and constituting the support for the gasket ring and to which the vertical spacing legs are secured.

5. In a liquid-vapor contact tower in which more nearly adjacent bubble cap supports are spaced one from another vertically, the improvement which comprises a tray the central section of which is adapted to support bubble caps, a separate flat gasket ring of flexible and elastic material engageable with the wall of the tower and beneath and constituting the support for the tray; a separate centering ring outside of and concentric with the bubble cap supporting section of the tray and overlying the gasket ring; a lower retaining ring underlying the gasket ring; bolts extending through the last named lower retaining ring, the flat gasket and the centering ring holding them in fixed relation; a seal supporting ring having upwardly extending outer and inner flanges enclosing the lower retaining ring that is secured to the gasket ring and centering ring, and spacing legs secured to and depending from the seal supporting ring.

6. In a liquid-vapor contact tower in which adjacent bubble cap trays are registered in relation to each other by vertical spacing legs, the improvement which comprises a tray member the central section of which is adapted to support bubble caps, a separate flat gasket ring of flexible and elastic material located beneath and constituting the support for the tray member, said gasket ring being relatively wide and thin and the periphery of which is slidably engageable with the inner wall of the tower, and a separate seal supporting ring member beneath and constituting the support for the gasket ring, each of said spacing legs being secured permanently at one end to one of said members and at its other free end adapted to abut against the other of said members of a more nearly adjacent bubble cap support in assembly of the bubble cap trays in the tower, thereby allowing the trays to be assembled or disassembled by sliding them, one after another, into or out of the tower.

LELAND W. T. CUMMINGS.

REFERENCES CITED

The following references are of record in the file of this patent:

UNITED STATES PATENTS

| Number | Name | Date |
| --- | --- | --- |
| 381,803 | Marquis | Apr. 24, 1888 |
| 518,941 | Deckebach | May 1, 1894 |
| 1,686,542 | Winkler | Oct. 9, 1928 |
| 1,753,429 | Rise | Apr. 8, 1930 |
| 1,770,658 | Kremser | July 15, 1930 |
| 2,237,680 | Mack | Apr. 8, 1941 |
| 2,241,114 | Brunjes | May 6, 1941 |
| 2,241,370 | Armstrong | May 6, 1941 |